(12) United States Patent
Pratt et al.

(10) Patent No.: US 7,949,430 B2
(45) Date of Patent: May 24, 2011

(54) DETERMINATION OF FOOT PLACEMENT FOR HUMANOID PUSH RECOVERY

(75) Inventors: Jerry Pratt, Pensacola, FL (US); Ambarish Goswami, Fremont, CA (US)

(73) Assignees: Honda Motor Co., Ltd., Tokyo (JP); Florida Institute for Human & Machine Cognition, Inc., Pensacola, FL (US)

( * ) Notice: Subject to any disclaimer, the term of this patent is extended or adjusted under 35 U.S.C. 154(b) by 784 days.

(21) Appl. No.: 11/946,702

(22) Filed: Nov. 28, 2007

(65) Prior Publication Data
US 2008/0133053 A1 Jun. 5, 2008

Related U.S. Application Data

(60) Provisional application No. 60/861,903, filed on Nov. 29, 2006.

(51) Int. Cl.
*G05B 13/04* (2006.01)
*G05B 19/416* (2006.01)

(52) U.S. Cl. ... 700/253; 700/250; 700/254; 318/568.17; 318/568.12; 318/568.16; 180/8.5; 702/150; 901/1

(58) Field of Classification Search ............ 901/27, 901/30; 700/252
See application file for complete search history.

(56) References Cited

U.S. PATENT DOCUMENTS

| | | | |
|---|---|---|---|
| 4,834,200 A * | 5/1989 | Kajita | 180/8.1 |
| 5,221,883 A * | 6/1993 | Takenaka et al. | 318/568.12 |
| 6,915,230 B2 | 7/2005 | Kawai et al. | |
| 6,969,965 B2 | 11/2005 | Takenaka et al. | |
| 7,120,518 B2 | 10/2006 | Takenaka et al. | |
| 2005/0065650 A1 * | 3/2005 | Lewis | 700/245 |

(Continued)

FOREIGN PATENT DOCUMENTS

WO   WO 2005098733 A2 * 10/2005

OTHER PUBLICATIONS

Shuuji Jkajita et al., The 3D Linear Inverted Pendulum Mode: A simple modeling for a biped walking pattern generation, Proceedings of the 2001 IEEE/RSJ, International Conference on Intelligent Robots and Systems, Oct. 29th-Nov. 3rd, 2001, pp. 239-246.*

(Continued)

*Primary Examiner* — Thomas G Black
*Assistant Examiner* — Lin B Olsen
(74) *Attorney, Agent, or Firm* — Fenwick & West LLP; Mark E. Duell

(57) ABSTRACT

A legged robot subjected to a force is controlled by determining an instantaneous capture point where the robot will step with a swing leg to reach a balanced home position, the balanced home position being a state in which the Center of Mass remains substantially over the Center of Pressure and the robot is able to maintain its balance indefinitely. The capture point can be determined using a Linear Inverted Pendulum Plus Flywheel (LIPPF) model of the robot. The LIPPF model includes a flywheel with a mass and a rotational inertia, and a variable length leg link. A torque profile is applied to the flywheel and a set of capture points is determined based on this torque profile An experimentally determined error value can be added to a capture point that is determined based on the model to account for differences between an actual robot and the model.

20 Claims, 3 Drawing Sheets

U.S. PATENT DOCUMENTS

| | | | |
|---|---|---|---|
| 2005/0113973 A1 | 5/2005 | Endo et al. | |
| 2005/0154492 A1* | 7/2005 | Takenaka et al. | 700/245 |
| 2005/0234593 A1 | 10/2005 | Goswami et al. | |
| 2006/0241809 A1* | 10/2006 | Goswami et al. | 700/245 |
| 2007/0016329 A1 | 1/2007 | Herr et al. | |

OTHER PUBLICATIONS

Abdallah, M., et al., "A Biomechanically Motivated Two-Phase Strategy for Biped Upright Balance Control," Proceedings of the 2005 IEEE, International Conference on Robotics and Automation, Barcelona, Spain, Apr. 2005, pp. 2008-2013.*

Yamakita, M., et al., "Virtual Coupling Control for Dynamic Bipedal Walking," IEEE International Conference on Intelligent Robots and Systems, 2001, p. 233-238, vol. 1.*

Shuuji Kajita et al., *The 3D Linear Inverted Pendulum Mode: A simple modeling for a biped walking pattern generation*, Proceedings of the 2001 IEEE/RSJ, International Conference on Intelligent Robots and Systems, Oct. $29^{th}$-Nov. $3^{rd}$, 2001, pp. 239-246.

Shuuji Kajita et al., *Resolved Momentum Control: Humanoid Motion Planning based on the Linear and Angular Momentum*, Proceedings of the 2003 IEEE/RSJ, International Conference on Intelligent Robots and Systems, Oct. 2003, pp. 1644-1650.

Shuuji Kajita et al., *Study of Dynamic Biped Locomotion on Rugged Terrain*, Proceedings of the 1991 IEEE International Conference on Robotics and Automation, Apr. 1991, pp. 1405-1411.

Taku Komura et al., *Simulating Pathological Gait Using the Enhanced Linear Inverted Pendulum Model*, IEEE Transaction on Biomedical Engineering, Sep. 2005, pp. 1502-1513, vol. 52, No. 9.

Taku Komura et al., *Animating Reactive Motions for Biped Locomotion*, VRST 04, Nov. $10^{th}$-$12^{th}$, 2004, 9 pages.

Taku Komura et al., *A Feedback Controller for Biped Humanoids that Can Counteract Large Perturbations During Gait*, Proceedings of the 2005 IEEE International Conference on Robotics and Automation, Apr. 2005, pp. 1989-1995.

Jong H. Park et al., *Biped Robot Walking Using Gravity-Compensated Inverted Pendulum Mode and Computed Torque Control*, Proceedings of the 1998 IEEE International Conference on Robotics & Automation, May 1998, pp. 3528-3533.

J.E. Pratt et al., *Velocity-Based Stability Margins for Fast Bipedal Walking*, Fast Motions in Biomechanics and Robotics Optimization and Feedback Control, 2006, pp. 299-324, Springer Publishing, Germany.

PCT International Search Report and Written Opinion, PCT Application No. PCT/US2009/067932, Feb. 4, 2010, 6 pages.

PCT International Search Report and Written Opinion, PCT/US2008/083935, Jan. 28, 2009, 8 Pages.

PCT International Search Report and Written Opinion, PCT/US2007/085795, Jun. 19, 2008, 8 Pages.

* cited by examiner

DETERMINATION OF FOOT PLACEMENT FOR HUMANOID PUSH RECOVERY

CROSS-REFERENCE TO RELATED APPLICATION

This application claims priority from the following U.S. provisional patent application, which is hereby incorporated by reference: Ser. No. 60/861,903, filed on Nov. 29, 2006 entitled "Capture Point: A Step Toward Humanoid Push Recovery."

BACKGROUND OF THE INVENTION

1. Field of the Invention

The present invention relates to push recovery for a humanoid robot.

2. Description of Background Art

When subjected to a push, or force, a bipedal robot may need to take action to avoid falling. A push can occur, for example, when the robot bumps into an object or is tripped by debris or rocks. Possible actions to avoid falling after a push include the robot taking a step or otherwise moving its body.

It is useful for a robot to be able to determine what actions to take so that the robot will be able to recover from a push. For example, the robot can determine when and where to take a step. The robot should be able to determine the actions in a computationally efficient manner since the actions may need to be taken almost immediately after the push. The types of actions that can be taken include moving the Center of Pressure within the foot, accelerating internal angular momentum through lunging and "windmilling" of appendages, and taking a step.

However, determining actions to take is difficult because bipedal walking dynamics are high-dimensional, non-linear, and hybrid. Models of walking with simpler dynamics that approximate an actual robot can be used to allow for more computationally efficient determination of actions. Possible models include the Linear Inverted Pendulum (LIP) model and the Angular Momentum Pendulum Model (AMPM). However, the model should also be complete enough to accurately determine the actions.

What is needed is a method for efficiently determining actions to take to avoid falling after a push, including where to take a step.

SUMMARY OF THE INVENTION

The above need is met by a method for controlling a legged robot subjected to a force by determining an instantaneous capture point where the robot will step with a swing leg to reach a balanced home position, the balanced home position being a state in which the Center of Mass remains substantially over the Center of Pressure and the robot is able to maintain its balance indefinitely. One type of balanced home position is a complete stop. The capture point can be determined using a Linear Inverted Pendulum Plus Flywheel (LIPPF) model of the robot. The LIPPF model includes a flywheel with a mass and a rotational inertia, and a variable length leg link. A torque profile is applied to the flywheel and a set of capture points is determined based on this torque profile An experimentally determined error value can be added to a capture point that is determined based on the model to account for differences between an actual robot and the model.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE EMBODIMENTS

Figure 1:
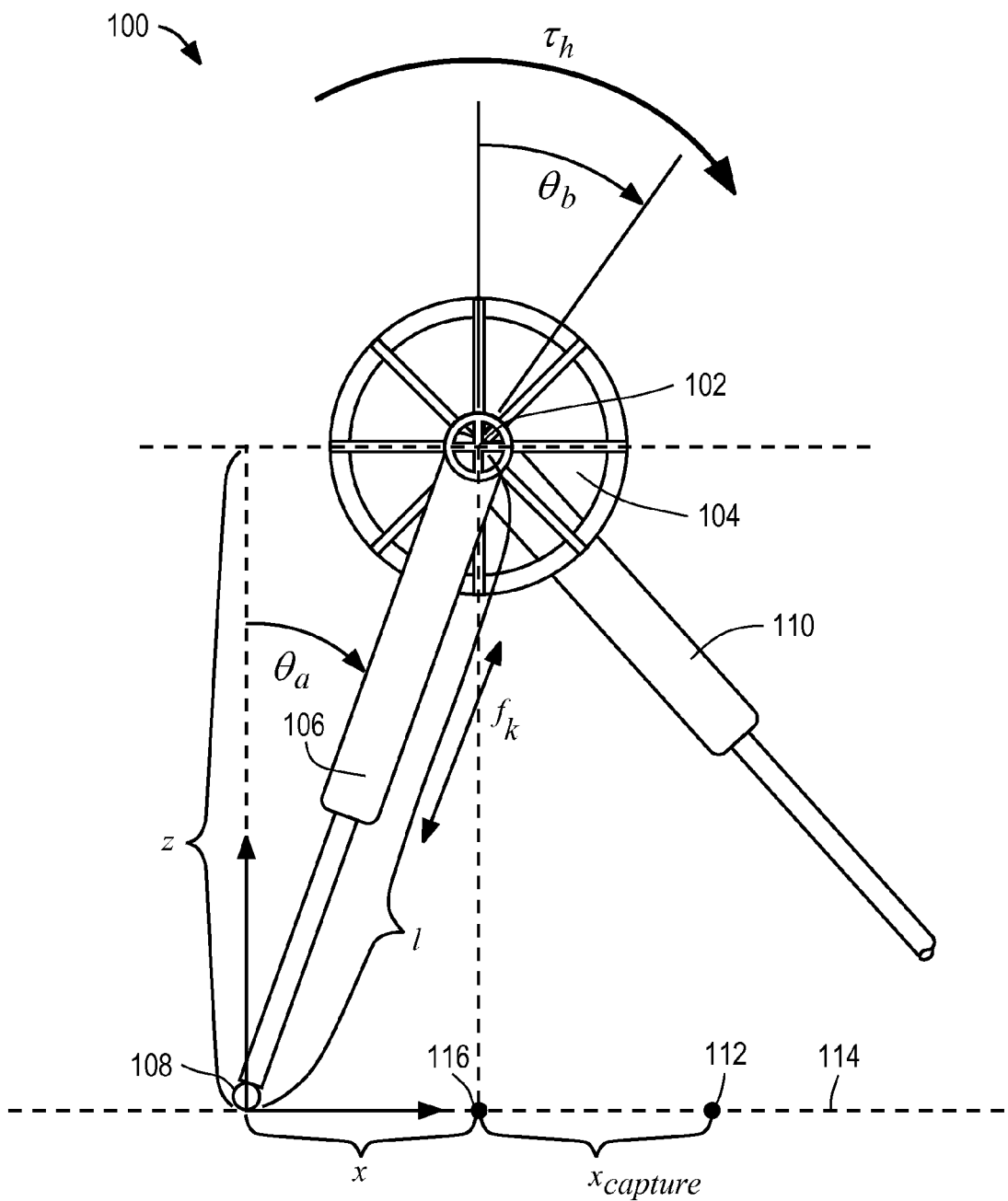
FIG. 1 illustrates a model of a biped as a planar inverted pendulum with an inertial flywheel.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

In the description that follows, the term "robot" is used to describe a humanoid bipedal robot. The term "biped" is used to describe either a humanoid or humanoid bipedal robot, or a model of a humanoid or humanoid bipedal robot.

Capture Points and Capture Region

A robot subjected to a push can enter an unstable state where a fall is imminent unless the robot takes a step to regain stability. For example, a robot standing upright on a horizontal surface may be subjected to a push parallel to the surface causing the robot to fall toward the surface. The push results in a change of the state of the robot, where the state includes the position and velocity of the robot.

In a given state resulting from a push, a robot may be able to take a step with one foot to bring itself to a balanced home position in which the Center of Mass lies over the foot and the robot's velocity is small. This foot is referred to as the swing foot and is the endpoint of the swing leg that comes in contact with the ground. The point of ground contact is referred to as the Center of Pressure. The foot that remains in place is referred to as the stance foot or support foot. A balanced home position can be defined is a state in which the robot can control itself. For example, after stepping with the swing foot to reach a balanced home position, the robot can maintain its balance on the swing foot indefinitely without taking another step by making small adjustments to its position. These adjustments may result in horizontal motion of the Center of Mass, but the horizontal velocity of the Center of Mass will remain below a small threshold velocity. In one embodiment, a balanced home position is a complete stop.

An instantaneous capture point is a point on the ground where the robot can step with the swing foot to bring itself to a balanced home position. A capture region is the collection of all capture points. A capture point and capture region can be calculated based on a model of the robot that approximates the actual mechanics of the robot. Further description of capture points and the capture region is given below.

Capture points and the capture region can be used to determine when and where to take a step to recover from a push. If an instantaneous capture point is situated within the convex hull of the stance foot, also referred to as the base of support, the robot is able to recover from the push without having to take a step. Otherwise, the robot takes a step to recover from the push. In order to stop in one step, the robot must step such that its base of support regains an intersection with the capture region. After a step is taken, the swing foot becomes the stance foot and the base of support is the convex hull of this foot. If the capture region lies outside of the range of the swing foot, the robot is not able to step in the capture region in a single step, and therefore may not be able to recover from a push in one step. The robot may still be able to stop in two or more steps, or may not be able to stop at all.

A capture state is a state in which the kinetic energy of the biped is zero and can remain zero with suitable joint torques. In a capture state, the Center of Mass lies above the Center of Pressure. A vertical upright position is an example of a capture state. A safe feasible trajectory is a trajectory through state space that is consistent with the robot's dynamics, is achievable by the robot's actuators, and does not contain any states in which the robot has fallen. For a biped in a given state, an instantaneous capture point, P, is a point on the ground such that if the biped covers P (makes its base of support include P), either with its stance foot or by stepping to P in a single step, and then maintains its Center of Pressure to lie on P, then there exists a safe feasible trajectory leading to a capture state.

Linear Inverted Pendulum Plus Flywheel Model

In the Linear Inverted Pendulum (LIP) Model, a biped is approximated as a point mass at a location corresponding to a hip. The point mass is maintained at a constant height and is supported by a stance foot with a variable length leg link. The stance foot is not a separate entity, but rather just the tip of the leg link that is in contact with the ground. The point mass is also connected to a variable length swing leg attached to the swing foot. The point mass may be pushed resulting in a particular state. Under the LIP Model, a given state has a corresponding unique instantaneous capture point. The unique instantaneous capture point is the point such that if the robot immediately places its swing foot there and transfers support to it, the robot will come to a stop over that point. As the state of the robot changes, the instantaneous capture point location changes.

Human or robot movements such as a forward lunge and rapid arm rotations make use of angular momentum to maintain balance. However, the LIP Model lacks rotational inertia and cannot capture this behavior. To include rotational inertia, a Linear Inverted Pendulum Plus Flywheel (LIPPF) Model can be used. In this model, the point mass of the LIP Model is replaced with a flywheel to explicitly model angular momentum about the body Center of Mass (CoM). Since the robot can accelerate the CoM by changing the angular momentum stored in the flywheel, the unique instantaneous capture point of the LIP model extends to a set of contiguous points, the capture region, under the LIPPF model.

The flywheel of the LIPPF Model has a centroidal moment of inertia and rotational angle limits that enable it to explicitly model centroidal angular momentum. Angular momentum can be used to capture balance after disturbed and angular momentum can benefit lateral stability in walking. Bipedal robots have limited rotation angles and velocities unlike a true flywheel. Such limits can be incorporated into the model.

The LIPPF Model described here can be applied to actual robots even though the model may be a simplified representation of the robot. The robot often does not need to exactly place its swing foot in a particular position to avoid falling down. Having relatively large feet and internal inertia provide additional control opportunities to make up for imprecise foot placement. Additionally, the results obtained from a model can be slightly modified based on experimental results that show predictable differences between the behavior of the model and the actual robot. For example, a small value $\Delta x$ may be added to a model-determined instantaneous capture point within certain coordinates before applying it to the robot. This enables the use of a computationally efficient model to control an actual robot with more complicated dynamics.

FIG. 1 illustrates a model 100 of a biped as a planar inverted pendulum with an inertial flywheel. The biped comprises a support leg (or stance leg) 106, a swing leg (or step leg) 110, and a flywheel 104. The biped also includes an actuator in the support leg and an actuator at the center of the flywheel. The flywheel has mass m and rotational inertia J with a Center of Mass at 102. The flywheel actuator is capable of rotating the flywheel. $\tau_h$ represents the torque on the flywheel produced by the flywheel actuator. $\theta_b$ represents the flywheel angle with respect to vertical.

The legs connect to the Center of Mass and can freely move around that point. The legs are massless and variable-length. The support leg 106 is in contact with the ground 114. The point of contact 108 represents the support foot and is the location of the Center of Pressure. $f_k$ represents the linear force on the leg produced by support leg actuator. $\theta_a$ represents the support leg angle with respect to vertical. l represents the length of the support leg, or the distance from the support foot to the Center of Mass. The swing leg 110 is the leg that the biped uses to take a step. If, for example, an instantaneous capture point is determined to be point 112, then the swing leg will swing in a trajectory that allows it to land on point 112 to come to a balanced home position.

The Center of Mass 102 is at a height z above the ground 114. The projection of the Center of Mass onto the ground is shown as point 116. The legs 106 and 110 extend and contract to keep the Center of Mass at constant height z. x represents the horizontal distance from the Center of Pressure to the Center of Mass. The Center of Mass may be horizontally moving relative to the Center of Pressure at a speed of $\dot{x}$. As mentioned above, the model 100 represents a biped robot with legs, a Center of Mass, and rotational inertia. The height, z, of the Center of Mass corresponds to the hip height of the robot. The model, when subjected to a push, can come to a balanced home position by a combination of spinning the flywheel 104, applying a force on the support leg 106, and stepping with the swing leg on particular points on the ground.

The equations of motion for the model illustrated in FIG. 1 during the single support phase are:

$$m\ddot{x} = f_k \sin\theta_a - \frac{\tau_h}{l}\cos\theta_a \quad (1)$$

$$m\ddot{z} = -mg + f_k \cos\theta_a + \frac{\tau_h}{l}\sin\theta_a \quad (2)$$

$$J\ddot{\theta}_b = \tau_h \quad (3)$$

$\ddot{x}$ represents the horizontal acceleration of the Center of Mass, $\ddot{z}$ represents the vertical acceleration of the center of mass, l represents the distance from the stance foot to the CoM, $\ddot{\theta}_b$ represents the flywheel angular acceleration, and g represents the gravitational acceleration constant.

Equations of motion 1-3 are nonlinear. The LIPPF model can be derived as a special case of the above model by constraining the vertical movement of the Center of Mass, i.e. by setting $\ddot{z}=\dot{z}=0$ and $z=z_0$, where $z_0$ is a constant. Solving Equation 2 under these conditions for $f_k$ gives:

$$f_k = \frac{mg}{\cos\theta_a} - \frac{1}{l}\frac{\sin\theta_a}{\cos\theta_a}\tau_h \quad (4)$$

Since $\cos\theta_a = z/l$ and $\sin\theta_a = x/l$, Equation 4 becomes:

$$f_k = \frac{mg}{z_0}l - \frac{1}{l}\frac{x}{z_0}\tau_h$$

Substituting $f_k$ into Equation 1 yields the LIPPF equations of motion:

$$\ddot{x} = \frac{g}{z_0}x - \frac{1}{mz_0}\tau_h \quad (6)$$

$$\ddot{\theta}_b = \frac{1}{J}\tau_h$$

These equations of motion are linear given that z is constant. This linearity enables easier calculation of capture points.

Capture Point for the Linear Inverted Pendulum Model

If $\tau_h$ is set to 0, then the flywheel in the LIPPF model does not have an effect. Equations 6 reduce to the equation of motion for the Linear Inverted Pendulum model:

$$\ddot{x} = \frac{g}{z_0}x \quad (7)$$

A conserved quantity referred to as the Linear Inverted Pendulum Orbital Energy, $E_{LIP}$, can be defined as follows:

$$E_{LIP} = \frac{1}{2}\dot{x}^2 - \frac{g}{2z_0}x^2 \quad (8)$$

where $\dot{x}$ represents the horizontal velocity of the center of mass.

Equation 8 represents a mass-spring system with unit mass and a negative-rate spring with a stiffness of $$-\frac{g}{z_0}.$$

If the Center of Mass is moving toward the support foot and $E_{LIP}>0$, then there is enough energy for the CoM to go over the foot and continue on its way. If $E_{LIP}<0$, then the CoM will stop and reverse directions before getting over the foot. If $E_{LIP}=0$, then the CoM will come to rest over the foot. The equilibrium state $E_{LIP}=0$ defines the two eigenvectors of the system:

$$\dot{x} = \pm x \sqrt{\frac{g}{z_0}} \quad (9)$$

Equation 9 represents a saddle point with one stable and one unstable eigenvector. x and $\dot{x}$ have opposite signs (the Center of Mass is moving toward the Center of Pressure) for the stable eigenvector and the same signs (the CoM is moving away from the CoP) for the unstable eigenvector.

$E_{LIP}$ remains constant until the swing foot is placed. Once the swing foot is placed, the feet change roles so that the swing foot becomes the support foot and vice versa. Assuming that the exchange happens instantaneously, without energy loss, foot placement can be solved for based on either desired orbital energy, $E_{LIP}$, or the desired speed at a given value of x. The instantaneous capture point is computed based on the foot placement required to obtain an orbital energy of zero and corresponding to the stable eigenvector from Equation 9:

$$x_{capture} = x \sqrt{\frac{z_g}{g}} \quad (10)$$

where $x_{capture}$ is the horizontal distance from the Center of Mass to the instantaneous capture point for the given state. $x_{capture}$ is shown in FIG. 1.

Figure 2:
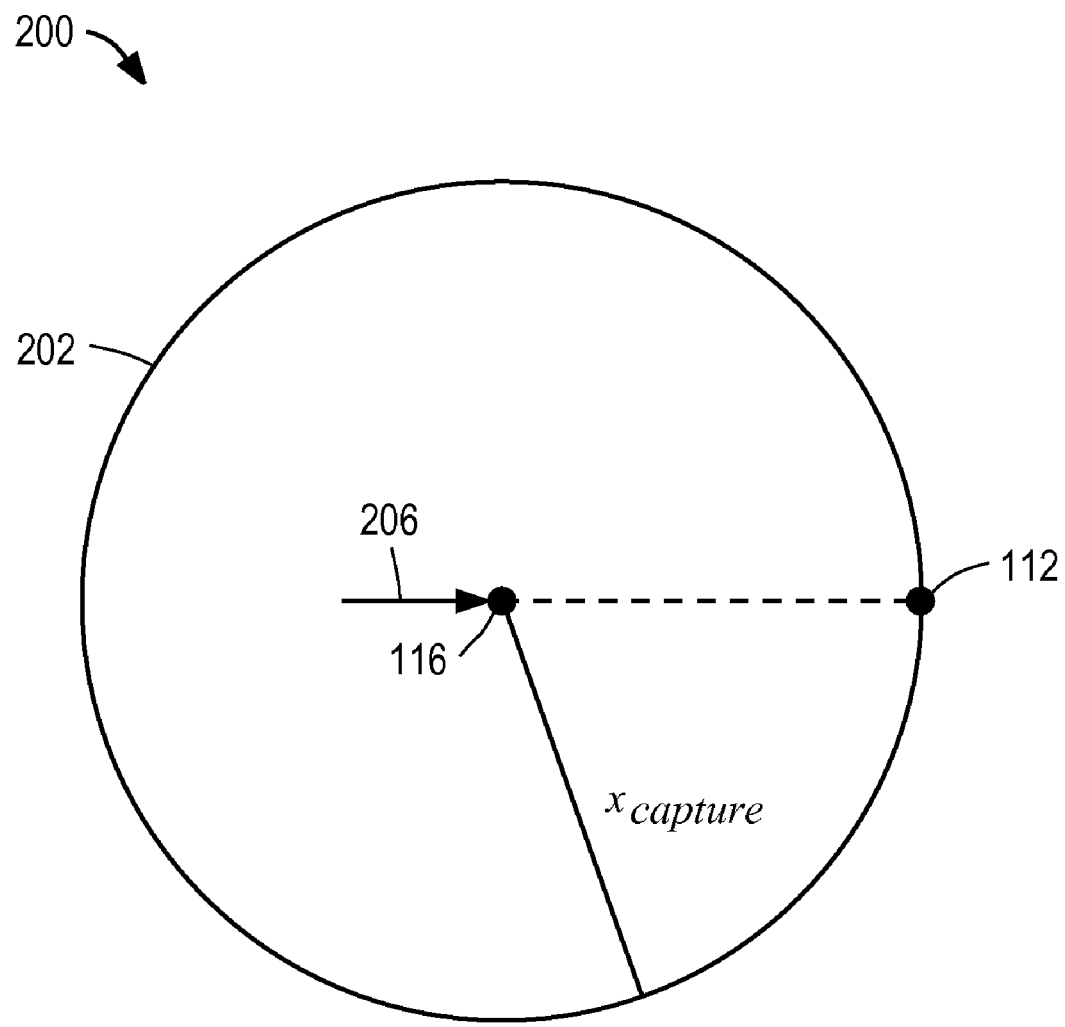
FIG. 2 illustrates a set of capture points for a biped based on the Linear Inverted Pendulum model.

FIG. 2 illustrates a set of capture points for a biped based on the Linear Inverted Pendulum model. The plane 200 corresponds to a top view of the ground 114. The set 202 of capture points is illustrated as a circle centered on the ground projection 116 of the Center of Mass 102. The circle has radius $x_{capture}$, as determined in Equation 10. The biped can step to a point on the circle to come to a balanced home position based on the direction of motion of the Center of Mass. For example, if the Center of Mass is moving in the direction illustrated by arrow 206, then the biped can step to instantaneous capture point 112.

For a given state, the Linear Inverted Pendulum Model has a single instantaneous capture point corresponding to the footstep that would put the state of the robot onto the stable eigenvector. When the flywheel is made available, this point will grow to a line segment capture region. For this case, the shape of the capture region is a line segment. If the state is on one side of the stable eigenvector in phase space, then a clockwise acceleration of the flywheel will capture balance. If on the other side, then a counterclockwise acceleration will be required.

Different capture regions can be derived based on different assumptions about the ability of the flywheel to change position and velocity.

Capture Point for the Linear Inverted Pendulum Plus Flywheel Model

For a flywheel capable of instantaneous velocity change, suppose that an impulsive torque applied to the flywheel causes a step change in the rotational velocity of the flywheel of $\Delta\dot{\theta}_b$. This results in a step change in the forward velocity of $\Delta\dot{x}=-J/mz_0\Delta\dot{\theta}_r$. In this case, the instantaneous capture region is:

$$\sqrt{\frac{z_0}{g}}\left(\dot{x}-\frac{J}{mz_0}\Delta\dot{\theta}_{b_{max}}\right) < x_{capture} < \sqrt{\frac{z_0}{g}}\left(\dot{x}-\frac{J}{mz_0}\Delta\dot{\theta}_{b_{min}}\right) \quad (11)$$

where $\Delta\dot{\theta}_{b\ max}$ and $\Delta\dot{\theta}_{b\ min}$ are the maximum and minimum possible changes in rotational velocity of the flywheel. The minimum possible change in rotational velocity is defined as the largest change in velocity in the opposite direction. For a typical motor, when $\dot{\theta}=0$, $\Delta\dot{\theta}_{b\ min}=-\Delta\dot{\theta}_{b\ max}$.

For a flywheel capable of instantaneous position change, suppose that a step change in the rotational position of the flywheel of $\Delta\theta_b$ is produced. This causes a step change in the position of the CoM of $$\Delta x = -\frac{J}{mz_0}\Delta\theta_1.$$

In this case, the instantaneous capture region is:

$$\sqrt{\frac{z_0}{g}}\dot{x}-\frac{J}{mz_0}\Delta\theta_{b_{max}} < x_{capture} < \sqrt{\frac{z_0}{g}}\dot{x}-\frac{J}{mz_0}\Delta\theta_{min} \quad (12)$$

where $\Delta\theta_{b\ max}$ and $\Delta\theta_{b\ min}$ are the maximum and minimum possible changes in rotational angle of the flywheel. The minimum change in rotational angle is defined as the largest change in angle in the opposite direction.

Allowing step changes in either flywheel angular velocity or position produces the results above, which are potentially useful upper bounds on the capture region. However, such step changes are not physically possible. Capture regions can also be computed if the flywheel is torque limited and has limits on its minimum and maximum rotation angles.

Torque limits are realistic since most motors are torque limited and they can achieve the maximum torque nearly instantaneously when compared to physical time constraints. Torque limits enable computation of the capture region for the LIPPF model since the dynamics are linear and unit steps have simple Laplace transforms.

Suppose the robot is moving at velocity $\dot{x}_0$ and the flywheel is spinning at angular velocity $\dot{\theta}_0$ and has an angle of $\theta_0$ with respect to vertical. A flywheel torque profile and a stepping location are desired that will bring the robot to rest over its foot with no forward velocity or flywheel angular velocity.

The torque profile that will provide the most influence on velocity is the one which accelerates the flywheel as hard as possible in one direction and then decelerates it, bringing it to a stop at the maximum flywheel angle. The torque profile is given by:

$$\tau(t)=\tau_{max}u(t)-2\tau_{max}u(t-T_{R1})+\tau_{max}u(t-T_{R2}) \quad (13)$$

where $\tau(t)$ is the torque applied to the flywheel at time t, $\tau_{max}$ is the maximum torque that the joint can apply, u(t) is the unit step function, $T_{R1}$ is the time at which the flywheel stops accelerating and starts decelerating, and $T_{R2}$ is the time at which the flywheel comes to a stop. u(t)=1 when t≧0, 0 when t<0.

Given the torque profile in Equation 13, the flywheel angular velocity and position at time t are, respectively:

$$\dot{\theta}(t) = \dot{\theta}_0 + \frac{\tau_{max}}{J}(u^1(t) - 2u^1(t - T_{R1}) + u^1(t - T_{R2})) \quad (14)$$

$$\theta(t) = \theta_0 + \dot{\theta}_0 t + \frac{\tau_{max}}{J}\left(\frac{1}{2}u^2(t) - u^2(t - T_{R1}) + \frac{1}{2}u^2(t - T_{R2})\right) \quad (15)$$

where $u^1(t)$ is the ramp function. $u^1(t){=}t$ when $t{\geq}0$, 0 when $t{<}0$. $u^2(t){=}t^2$ when $t{\geq}0$, 0 when $t{<}0$.

Given the torque profile of Equation 13, it is desired that $\dot{\theta}(T_{R2}){=}\dot{\theta}_f$ and $\theta(T_{R2}){=}\theta_{max}$, where $\dot{\theta}_f$ represents the final angular velocity of the flywheel and $\theta_{max}$ represents the maximum flywheel angle. To find the extents of the capture region, $\dot{\theta}_f{=}0$. However, $\dot{\theta}_f$ can be kept in the equation since it may be desirable to have a final angular velocity which helps return the flywheel to the starting angular position. Solving for $T_{R1}$ in Equation 14 yields:

$$T_{R1} = \frac{1}{2}T_{R2} + \frac{J}{2\tau_{max}}(\dot{\theta}_f - \dot{\theta}_0) \quad (16)$$

Substituting $T_{R1}$ into Equation 15 and rearranging yields a quadratic equation in $T_{R2}$, $$\left[\frac{\tau_{max}}{4J}\right]T_{R2}^2 + \left[\frac{1}{2}(\dot{\theta}_f + \dot{\theta}_0)\right]T_{R2} + \left[\theta_0 - \theta_{max} - \frac{J}{4\tau_{max}}(\dot{\theta}_f - \dot{\theta}_0)^2\right] = 0 \quad (17)$$

which can be solved for $T_{R2}$. As a special case, if $\dot{\theta}_f{=}\dot{\theta}_0{=}0$, then $T_{R1}{=}(\frac{1}{2})T_{R2}$ and $$T_{R2} = \sqrt{\frac{4J}{\tau_{max}}(\theta_{max} - \theta_0)} \quad (18)$$

The position and velocity trajectories of the Center of Mass can be determined by integrating the equations of motion for the LIPPF model. Equation 19 is the equation of motion for the Center of Mass given in Equation 6:

$$\ddot{x} = \frac{g}{z_0}x - \frac{1}{mz_0}\tau_k \quad (19)$$

Equation 19 written in the form of Laplace transforms is $$\frac{X(s)}{\tau(s)} = -\frac{1}{mx_0}\left(\frac{1}{s^2 - w^2}\right) \quad (20)$$

where s represents the complex angular frequency, X(s) represents the Laplace transform of the position of the CoM, $\tau(S)$ represents the Laplace transform of the torque on the flywheel produced by the flywheel actuator, and $$w = \sqrt{\frac{g}{x_0}}.$$

The Zero Initial Response (ZIR) of this system is $$x(t)_{ZIR} = x_0\cosh(wt) + \frac{1}{w}\dot{x}_0\sinh(wt) \quad (21)$$

$$\dot{x}(t)_{ZIR} = wx_0\sinh(wt) + \dot{x}_0\cosh(wt)$$

where $x_0$ represents the initial position of the CoM with respect to the support foot and $\dot{x}_0$ represents the initial velocity of the CoM. The Zero State Response (ZSR), given the input in Equation 13, is:

$$x(t)_{ZSR} = -\frac{\tau_{max}}{mx_0w^2}[(\cosh(wt) - 1)u(t) - 2(\cosh(w(t - T_{R_1})) - 1)$$

$$u(t - T_{R_1}) + (\cosh(w(t - T_{R_2})) - 1)u(t - T_{R_2})]$$

$$\dot{x}(t)_{ZSR} = -\frac{\tau_{max}}{mx_0w}[\sinh(wt)u(t) - 2\sinh(w(t - T_{R1}))u(t - T_{R_1}) +$$

$$\sinh(w(t - T_{R_2}))u(t - T_{R_2})] \quad (22)$$

Combining the zero input response and the zero state response at time $T_{R2}$ gives:

$$x(T_{R2}) = P_1 + P_2 x_0 \quad (23)$$

$$\dot{x}(T_{R_2}) = P_3 + P_4 x_0$$

where $$P_1 = \frac{1}{w}\dot{x}_0\sinh(wT_{R2}) - \frac{\tau_{max}}{mx_0w^2}[\cosh(wT_{R2}) - 2\cosh \quad (24)$$

$$(w(T_{R2} - T_{R1})) + 1]$$

$$P_2 = \cosh(wT_{R2})$$

$$P_3 = \dot{x}_0\cosh(wT_{R2}) - \frac{\tau_{max}}{mx_0w}[\sinh(wT_{R2}) -$$

$$2\sinh(w(T_{R2} - T_{R1}))]$$

$$P_4 = w\sinh(wT_{R2})$$

After the flywheel stops at $t{=}T_{R2}$, the system will be governed by the LIP model. Therefore, to solve for an instantaneous capture point, the state must lie on the stable eigenvector of the LIP model:

$$\dot{x}(T_{R2}) = -wx(T_{R2}) \quad (25)$$

Using Equations 23 and 25 and the fact that $\cos h(y){+}\sin h(y){=}e^y$, $x_0$ can be determined as:

$$x_0 = -\frac{1}{w}\dot{x}_0 + \frac{\tau_{max}}{mg}\left[\frac{(e^{wT_{R2}} - 2e^{w(T_{R2}-T_{R1})} + 1)}{e^{wT_{R2}}}\right] \quad (26)$$

In the dynamic equations above, $x_0$ represents the location of the Center of Mass with respect to the support foot. The location of the support foot with respect to the Center of Mass will therefore be $-x_0$. Thus one boundary of the capture region is then $-x_0$:

$$\chi_{capture1} = -x_0 = \frac{1}{\omega}\dot{x}_0 - \frac{\tau_{max}}{mg}\left[\frac{e^{\omega T_{R2}} - 2e^{\omega(T_{R2}-T_{R1})} + 1}{e^{\omega T_{R2}}}\right] \quad (27)$$

The other boundary of the capture region can be determined by repeating the above with the torque limit of $\tau_{min}$ and the angle limit of $\theta_{min}$, where $\tau_{min}$ is the minimum torque that the joint can apply and $\theta_{min}$ is the minimum flywheel angle:

$$x_{capture2} = \frac{1}{\omega}\dot{x}_0 - \frac{\tau_{min}}{mg}\left[\frac{e^{\omega T_{R2}} - 2e^{\omega(T_{R2}-T_{R1})} + 1}{e^{\omega T_{R2}}}\right] \quad (28)$$

$\tau_{min}$ is the maximum torque in the opposite direction. For typical motors $\tau_{min} = -\tau_{max}$. To find an instantaneous capture point without the use of angular momentum, the above can be repeated with $T_{R1}=0$. $T_{R2}$ will be long enough to stop any spin that the flywheel may currently have and $x_0$ and $x_{capture}$ can be solved for as before:

$$x_{capture1} = \frac{1}{\omega}\dot{x}_0 - \frac{\tau_{max}}{mg}\left[\frac{1 - e^{\omega T_{R2}}}{e^{\omega T_{R2}}}\right] \quad (29)$$

$$x_{capture2} = \frac{1}{\omega}\dot{x}_0 - \frac{\tau_{min}}{mg}\left[\frac{1 - e^{\omega T_{R2}}}{e^{\omega T_{R2}}}\right] \quad (30)$$

Figure 3:
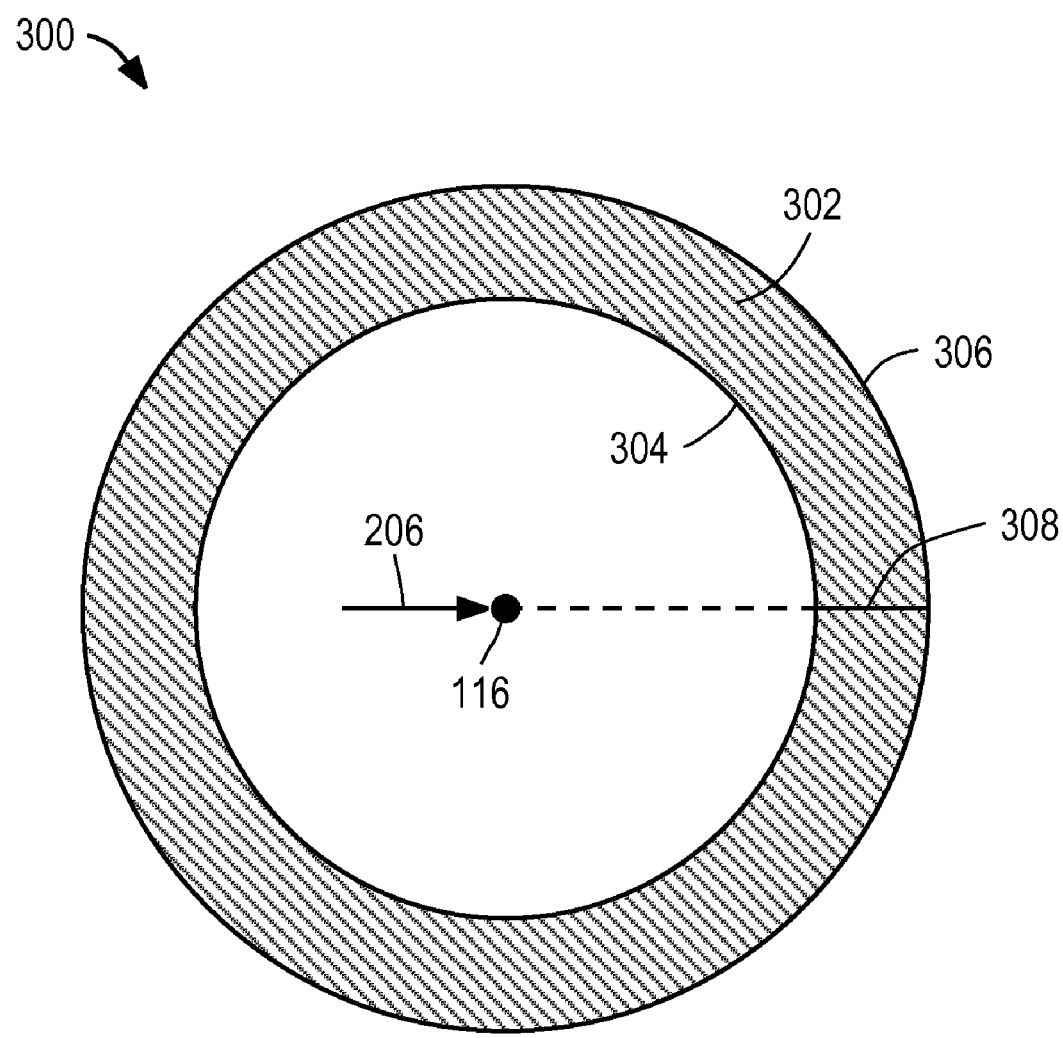
FIG. 3 illustrates a set of capture regions for a biped based on the Linear Inverted Pendulum Plus Flywheel model.

FIG. 3 illustrates a set of capture regions for a biped based on the Linear Inverted Pendulum Plus Flywheel model. The plane 300 corresponds to a top view of the ground 114. The set 306 of capture regions is illustrated as the regions between two circles centered on the ground projection 116 of the Center of Mass 102. The radius of the inner circle boundary 304 is $x_{capture1}$ as calculated in Equation 27, and the radius of the outer circle boundary is $x_{capture2}$ as calculated in Equation 28. The inner and outer boundaries may also represent the boundaries determined in Equations 11, 12, 29, or 30. The biped can step to a particular capture region to come to a balanced home position based on the current direction of the Center of Mass 102. For example, if the Center of Mass is moving in the direction illustrated by arrow 206, then the biped can step to capture region 308.

As illustrated in FIGS. 2 and 3, the addition of rotational inertia to the model expands a capture point 112 to a capture region 308. The ability of the biped to control its angular momentum enables the biped to step in various different places to come to a stop. In FIG. 3, for example, the biped can step at various points along capture region 308 based on the angular momentum the biped produces in itself.

Ground Reaction Forces

The ground reaction forces in the LIPPF model can be computed considering a free body diagram and examining $\ddot{x}$ and $\ddot{z}$:

$$f_z = mg, \; f_x = \frac{mg}{z_0}x - \frac{\tau_h}{z_0} \quad (31)$$

where $f_z$ represents the z-direction component of the ground reaction force vector, and $f_x$ represents the x-direction component of the ground reaction force vector. The ground reaction force is the force applied by the ground 114 to the point of contact 108. To prevent slipping, the ground reaction force vector should stay within the friction cone. Given a coefficient of friction, $\alpha$, $$-\alpha < \frac{f_x}{f_z} = \frac{x}{z_a} - \frac{\tau_h}{mgz_0} < \alpha \quad (32)$$

If $\tau_h = 0$ then $$\frac{f_x}{f_z} = \frac{x}{z_0},$$

which means that the angle of the support leg 106 must be inside the friction cone. Equivalently, $\theta_a$ must be less than $$\tan^{-1}\left(\frac{f_x}{f_z}\right).$$

For nonzero $\tau_h$, the ground reaction force vector is rotated to produce the torque $\tau_h$ about the CoM. For typical coefficients of friction, Equation 32 provides a limit on $\tau_h$, or equivalently on $$\ddot{\theta}_b = \frac{\tau_h}{J}.$$

A step change in either $\dot{\theta}_b$ or $\theta_b$ would require an impulsive torque which would cause the ground reaction force to be horizontal, causing slipping on any non-attached surface.

Although the invention has been described in considerable detail with reference to certain embodiments thereof, other embodiments are possible as will be understood to those skilled in the art.

What is claimed is:

1. A method for controlling a robot having at least two legs including a swing leg, the robot standing on a surface and subjected to a force, the method comprising:
   receiving, by a controller, a state vector comprising positions and velocities of joints of the robot;
   applying, by the controller, a linear motion model to the state vector that models at least a portion of the robot as an inverted pendulum, the linear motion model when applied to the state vector determining an instantaneous capture point on the surface where the robot will step with the swing leg to reach a balanced home position, the balanced home position being a state in which a center of mass of the robot remains substantially over a center of pressure of the robot such that the robot maintains balance; and
   outputting a control signal to an actuator that causes the robot to step with the swing leg to the instantaneous capture point.

2. The method of claim 1, wherein the instantaneous capture point is determined such that if the robot steps to the instantaneous capture point, a linear inverted pendulum orbital energy, $E_{LIP}$, will equal zero.

3. The method of claim 1, wherein the instantaneous capture point is located at a horizontal distance $x_{capture}$ from the center of mass of the robot, where $$x_{capture} = \dot{x}\sqrt{\frac{z_0}{g}},$$

where x represents a horizontal velocity of the center of mass, where $z_o$ represents a height of the center of mass above the surface, and where g represents a gravitational constant.

4. The method of claim 1, wherein the robot is a biped.

5. The method of claim 1, wherein the balanced home position further comprises a state in which the robot is able to maintain its balance on the swing leg indefinitely without taking another step.

6. The method of claim 1, wherein the balanced home position is a complete stop.

7. A method for controlling a robot having at least two legs including a swing leg, the robot standing on a surface and subjected to a force, the method comprising:
receiving, by a controller, a state vector comprising instantaneous positions and velocities of joints of the robot;
applying, by the controller, a linear motion model to the state vector that models a first portion of the robot as an inverted pendulum and models a second portion of the robot as a flywheel, the linear motion model when applied to the state vector determining a capture region on the surface where the robot will step with the swing leg to reach a balanced home position, the balanced home position being a state in which a center of mass of the robot remains substantially over a center of pressure of the robot such that the robot maintains balance; and
outputting a first control signal to an actuator that causes the robot to step with the swing leg to a point within the capture region.

8. The method of claim 7, further comprising:
determining an angular momentum that the robot will generate to reach the balanced home position; and
outputting a second control signal to the actuator that causes the robot to move according to the determine angular momentum.

9. The method of claim 7, wherein the linear motion model comprises a linear inverted pendulum plus flywheel model of the robot, the model comprising:
a flywheel with a mass and a rotational inertia, and
a variable length leg link connected to the flywheel.

10. The method of claim 9, wherein the flywheel is capable of instantaneous velocity change.

11. The method of claim 10, wherein the boundaries of the capture region are determined at least in part by a maximum velocity change of the flywheel and a minimum velocity change of the flywheel.

12. The method of claim 9, wherein the flywheel is capable of instantaneous position change.

13. The method of claim 12, wherein boundaries of the capture region are determined at least in part by a maximum position change of the flywheel and a minimum position change of the flywheel.

14. The method of claim 9, wherein a torque profile is applied to the flywheel, the torque profile comprising accelerating the flywheel in one direction for a period of time, decelerating the flywheel for a period of time, and stopping the flywheel at a maximum flywheel angle.

15. The method of claim 14, wherein boundaries of the capture region are determined at least in part by a maximum torque applied to the flywheel and a minimum torque applied to the flywheel.

16. The method of claim 9, wherein the capture region is a horizontal distance range from the center of mass of the robot, the horizontal distance range being greater than or equal to an inner boundary $x_{capture1}$ and less than or equal to an outer boundary $x_{capture2}$, wherein the inner boundary $x_{capture1}$ comprises a minimum horizontal distance that the robot may step with the swing leg to reach the balanced home position, and wherein the outer boundary $x_{capture2}$ comprises a maximum horizontal distance that the robot may step with the swing leg to reach the balanced home position.

17. The method of claim 9, further comprising:
adding an experimentally determined error value, $\Delta x$, to the instantaneous capture point, the error value to account for differences between the robot and the model.

18. A computer-readable storage medium storing computer-executable program instructions for controlling a robot having at least two legs including a swing leg, the robot standing on a surface and subjected to a force, the program instructions when executed cause a processor to perform steps of:
receiving a state vector comprising positions and velocities of joints of the robot;
applying a linear motion model to the state vector that models at least a portion of the robot as an inverted pendulum, the linear motion model when applied to the state vector determining an instantaneous capture point on the surface where the robot will step with the swing leg to reach a balanced home position, the balanced home position being a state in which a center of mass of the robot remains substantially over a center of pressure of the robot such that the robot maintains balance; and
outputting a control signal to an actuator that causes the robot to step with the swing leg to the instantaneous capture point.

19. The computer-readable storage medium of claim 18, wherein the instantaneous capture point is located at a horizontal distance $x_{capture}$ from the center of mass of the robot, where $$x_{capture} = \dot{x}\sqrt{\frac{z_0}{g}},$$

where $\dot{x}$ represents a horizontal velocity of the center of mass, where $z_0$ represents a height of the center of mass above the surface, and where g represents a gravitational constant.

20. A computer-readable storage medium storing computer-executable program instructions for controlling a robot having at least two legs including a swing leg, the robot standing on a surface and subjected to a force, the program instructions when executed cause a processor to perform steps of:
receiving, by a controller, a state vector comprising instantaneous positions and velocities of joints of the robot;
applying, by the controller, a linear motion model to the state vector that models a first portion of the robot as an inverted pendulum and models a second portion of the robot as a flywheel, the linear motion model when applied to the state vector determining a capture region on the surface where the robot will step with the swing leg to reach a balanced home position, the balanced home position being a state in which a center of mass of the robot remains substantially over a center of pressure of the robot such that the robot maintains balance; and
outputting a control signal to an actuator that causes the robot to step with the swing leg to a point within the capture region.

* * * * *